United States Patent [19]

Maki et al.

[11] 4,212,854
[45] Jul. 15, 1980

[54] METHOD FOR PURIFICATION OF AIR CONTAINING CARBON MONOXIDE

[75] Inventors: Masao Maki, Nabari; Seiichi Sano, Nara; Kunihiro Tsuruda, Yamatokoriyama; Ikuo Kobayashi, Nara, all of Japan

[73] Assignee: Matsushita Electric Industrial Co., Ltd., Japan

[21] Appl. No.: 887,678

[22] Filed: Mar. 17, 1978

[30] Foreign Application Priority Data

Mar. 18, 1977 [JP] Japan .................................. 52/30790
Dec. 29, 1977 [JP] Japan ................................ 52/157713

[51] Int. Cl.$^2$ ............................................. B01D 53/34
[52] U.S. Cl. .................................. 423/247; 423/213.5; 252/447; 252/466 PT; 252/473; 252/474
[58] Field of Search .................. 423/245, 247, 212 C, 423/213.5; 252/447, 473, 474, 446, 466 PT

[56] References Cited

U.S. PATENT DOCUMENTS

| | | | |
|---|---|---|---|
| 2,330,664 | 9/1943 | Bennett et al. | 423/213.5 |
| 3,205,179 | 9/1965 | Soderquist et al. | 252/477 X |
| 3,804,779 | 4/1974 | Kent et al. | 252/447 |
| 3,905,917 | 9/1975 | Nishino et al. | 423/212 C |
| 4,003,979 | 1/1977 | Kanno | 423/247 |
| 4,113,839 | 9/1978 | Maki et al. | 252/447 X |

FOREIGN PATENT DOCUMENTS 123190  11/1974  Japan ....................................... 423/247

Primary Examiner—Earl C. Thomas
Attorney, Agent, or Firm—Wenderoth, Lind & Ponack

[57] ABSTRACT

Method for removal of carbon monoxide from air wherein air to be purified is passed through a catalyst for promotion of oxidation of carbon monoxide consisting of a carrier including powdered activated carbon, an alkali, and a bonding agent and inpregnated with palladium alone or in combination one or more of the elements ruthenium, rhodium, and platinum. The amount of included alkali is made such that there is reduced risk of combustion due to presence of activated carbon, and the bonding agent renders the catalyst more resistant to vibration, while high rates of carbon removal are achieved at comparatively low temperature and high rates of air flow through the catalyst.

13 Claims, 10 Drawing Figures

(relating to 0.6% platinum)

(relating to 0.3% palladium 0.3% platinum)

METHOD FOR PURIFICATION OF AIR CONTAINING CARBON MONOXIDE

The present invention relates to a method for removal from the atmosphere of the noxious gas carbon monoxide. More particularly, the invention relates to a method for manufacture of a catalyst constituted principally of an agent for converting carbon monoxide present in the atmosphere to the comparatively harmless carbon dioxide.

In recent years, there has been a marked increase in atmospheric pollution, which, because of its undesirable effect on human health, has become a serious social problem. Typical pollutants responsible for this problem include, for example, sulfur oxides, nitrogen oxides, and carbon monoxide, and many efforts have been made to reduce the amount of such pollutants in the atmosphere by providing various kinds of controls at the sources of emission thereof, e.g., fixed sources, as in factory, or moving sources such as automobiles. However, at present these procedures cannot be expected to lead to such rapid reduction of noxious gases in the atmosphere, and in the future there can be expected to be at least some emission of noxious gases from stationary or moving sources, and since the number of pollutant emission sources is more likely to increase rather than decrease, there is the possibility of still further increase of high local concentrations of pollutants in the vicinity of emission sources or agglomerations of emission sources.

Carbon monoxide is a highly noxious gas which has caused many cases of poisoning and presents a particular problem in that, although its toxicity is well known, accumulation thereof is frequently undetected since it is odorless and tasteless.

A principal source of emission of carbon monoxide is the automobile, and the recent rapid increase in the number of automobiles on the roads has led to frequent occurrence of very high levels of carbon monoxide concentration in road tunnels, underground roads, or underground parking areas, or at highway toll gates, for example. This pollution is a serious problem for drivers and also for people living in the vicinity of places such as noted above. Since it is not possible to achieve marked suppression of carbon monoxide emission at present and will probably not be possible to achieve complete suppression in the future, it has been proposed to resolve the problem by cleaning atmosphere in which high concentrations of pollutants are liable to occur.

Conventionally, purification of the atmosphere has been aimed principally at removal of particulates therefrom, and proposed methods for removal of noxious gases have been comparatively few. There have, however, been developed in recent years methods for removal of sulfur oxides and other noxious gases by making use of catalysts or absorbents such as activated carbon or alkalis, but, although some methods which are specifically intended to remove carbon monoxide have been proposed, the attempts made so far to deal with this particular pollutant have met with many technical problems and up to the present, no really satisfactory method has been found.

It was previously considered that low concentrations of carbon monoxide in the surrounding atmosphere were not dangerous, but recent reports indicating that, for example, in some cases road accidents on high-speed highways have been the result of a driver being at least partially overcome by carbon monoxide and much medical data show that even at a concentration as low as 10 ppm the presence of carbon monoxide in the atmosphere presents a serious problem.

It is one object of the present invention to make it possible to remove such small amounts of carbon monoxide from the atmosphere by bringing air containing carbon monoxide into contact with a new type of catalyst which needs to be used only in very small quantities, which is easily handled, and which under normal temperature conditions effects conversion of the carbon monoxide to carbon dioxide.

Methods for removal of carbon monoxide may be broadly classified as adsorption methods, absorption methods, and catalytic oxidation methods. Since adsorption and absorption methods make use of granulated or similar material, there are limits to the amount of carbon monoxide which can be adsorbed or absorbed, and unless a very large amount of material is employed these methods are unsuited for removal or carbon monoxide present at concentration levels of several ppm in air. For removal of carbon monoxide emitted by sources such as automobiles, therefore, a catalytic oxidation method is more practicable.

A typical catalytic oxidation reaction is

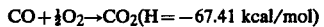

$$CO + \tfrac{1}{2}O_2 \rightarrow CO_2 (H = -67.41 \text{ kcal/mol})$$

A well-known catalyst which may promote such a reaction is activated alumina carrying or impregnated with 0.1 to 0.5 wt% platinum. However, this catalyst causes no reaction at all at normal temperature, and temperature must be raised to the vicinity of 100° C. to permit the catalyst to be effective. In other words, for practical application of a carbon monoxide, CO, removal method making use of this catalyst, it is necessary to provide means for heating the air containing the CO, and also means for cooling the air to ambient temperature again after removal of the CO. Associated equipment is therefore very complex and costly to run, in addition to which some of the necessary associated equipment may itself constitute a source of CO emission.

It is a further object of the invention, therefore, to provide a method permitting removal of CO from the atmosphere in a reaction taking place at normal temperature, which has been hitherto difficult to achieve in practical systems.

There have in fact, been various attempts to effect CO removal in the vicinity of normal temperature. For example, there are known catalysts which are constituted by activated carbon carrying or impregnated with palladium or another noble metal, and which from the viewpoint of preparation and use offer definite improvement over previously known means. However, since a temperature of about 40° C. is necessary for such catalysts to be satisfactorily active and space velocity during the CO removal process using the catalysts must not be more than 1,000 to 2,000 (hr$^{-1}$), and since there are also problems concerning stability and durability of the material of the catalysts, there has not yet been developed a method for use of these catalysts in practical applications.

Apart from disadvantages relating to speed, etc. of the CO removal process, catalysts constituted by activated carbon carrying palladium or other noble metals have several drawbacks which render them basically unuseable in large-scale practical purification equipment.

A first drawback is that at normal temperature, since noble metals may easily absorb various kinds of gas, catalysts including noble metals may easily become poisoned due to the different kinds of gases present in the atmosphere. Examples of gases which may cause such poisoning are organic gases which are present in small amounts in the atmosphere and other noxious gases such as nitrogen oxides, $NO_x$, and sulfur oxides, $SO_x$, in addition to which poisoning may be caused by carbon dioxide or moisture in the atmosphere. In some cases these substances are absorbed in the pores of the carrier and so prevent diffusion of CO onto the surface of noble metal in the pores, or are adsorbed on the surface of the noble metal and interfere with adsorption of CO or oxygen or with the surface reaction, with the result that the catalyst may become unuseable after the very short time of only 10 to 100 hours.

A second drawback is that the activated carbon carrier is brittle. In particular, the resistance thereof to abrasion is low, with the result that if purification equipment containing activated carbon particles in contact with one another is subjected to vibration, for example, crumbling of the activated carbon particles occurs, resulting in production of dust which increases packing pressure and causes blockage of pores.

A third reason is that there is very great adsorption of CO on noble metal-activated carbon catalysts in the vicinity of room temperature. The adsorption of a large amount of CO and oxidation reaction proceed during or immediately after the induction period, but, depending on operating conditions, large-scale oxidation of CO may occur in a very short time. As indicated in the reaction equation noted above, oxidation of CO is an exothermic reaction, and the sudden production of a large amount of reaction heat may result in further activation of the noble metal and risk of fire, since the carrier, activated carbon, is a combustible material, and there are many fine particles vicinity of the place where the reaction takes place. The inventors found, by experiment, that the same problem is liable to arise if for some reason there is a sudden increase of CO concentration in the air which is being purified.

If, in order to avoid the above-described problems, use is made of a carrier having great resistance to combustion, for example, alumina, silica, silica-alumina, zeolite, diatomaceous earth, etc., activity and results achieved are not as great as when activated carbon is employed, and temperature for the process must be around 50° C., so necessitating use of supplementary heating means and rendering use of such combustion-resisting materials unsuitable in practical equipment.

Apart from noble-active carbon carrier catalysts, another well-known type of catalyst for effecting removal of CO from air in the vicinity of room temperature is the hopcalite type of catalyst consisting of manganese dioxide as main component and mixed with the oxide of a metal such as copper, iron, cobalt, or silver. However, such material also is unsuited to practical application, since it is easily poisoned by moisture in the atmosphere and rapidly loses ability to effect CO removal in the vicinity of room temperature, and a process using such material therefore demands provision of supplementary equipment for complete removal of moisture from the air to be purified or for heating the air to a temperature of 80° C. or more, at which the effect of humidity is small.

It is accordingly an object of the present invention to provide a method which permits highly efficient removal of carbon monoxide from air at normal temperature, by means of newly developed catalyst including a carrier.

It is a further object of the invention to provide a method for removal of carbon monoxide from air at normal temperature for a long period without deterioration of efficiency.

In accomplishing these and other objects, there is provided, according to the present invention, a method for removal of carbon monoxide from air in which air to be purified is brought into contact with a catalyst including a carrier which is a solid substance comprising powdered activated carbon, alkali and water-hardenable cement. The catalyst is resistant to abrasion due to the effects of vibration, etc., and carries, or is impregnated with palladium alone or in combination with one or more of the elements ruthenium, rhodium, and platinum.

The invention will be described in greater detail, with reference to the attached drawings, in which.

Figure 6:
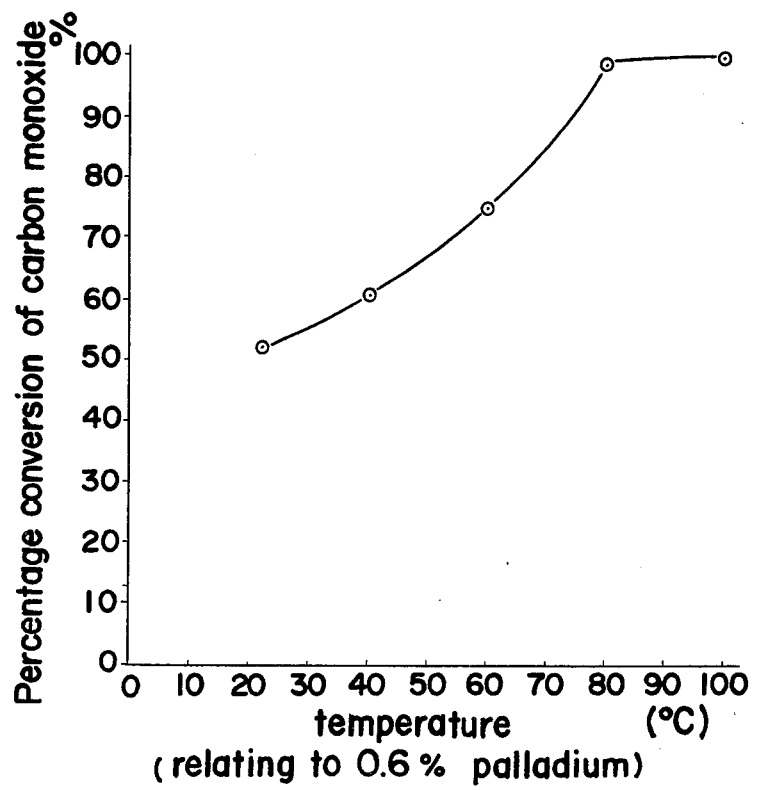
Figure 7:
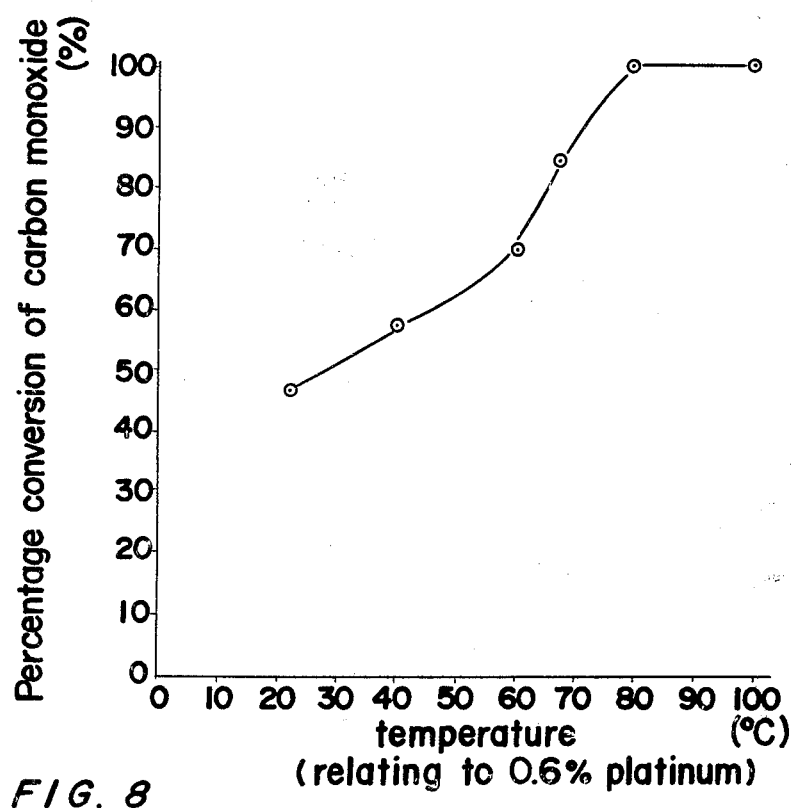
Figure 8:
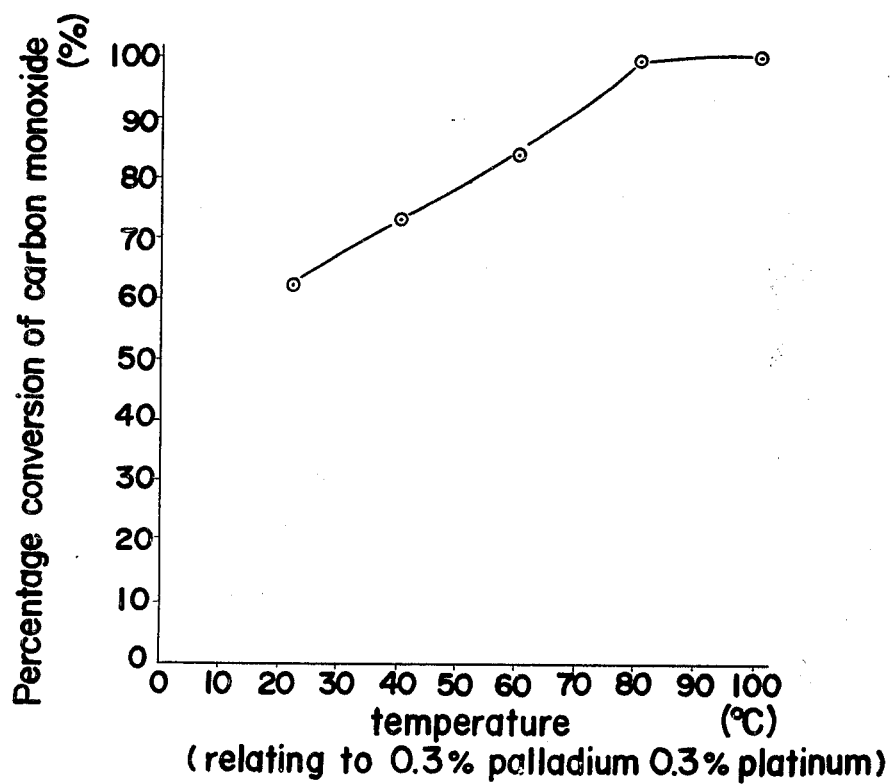
Figure 9:
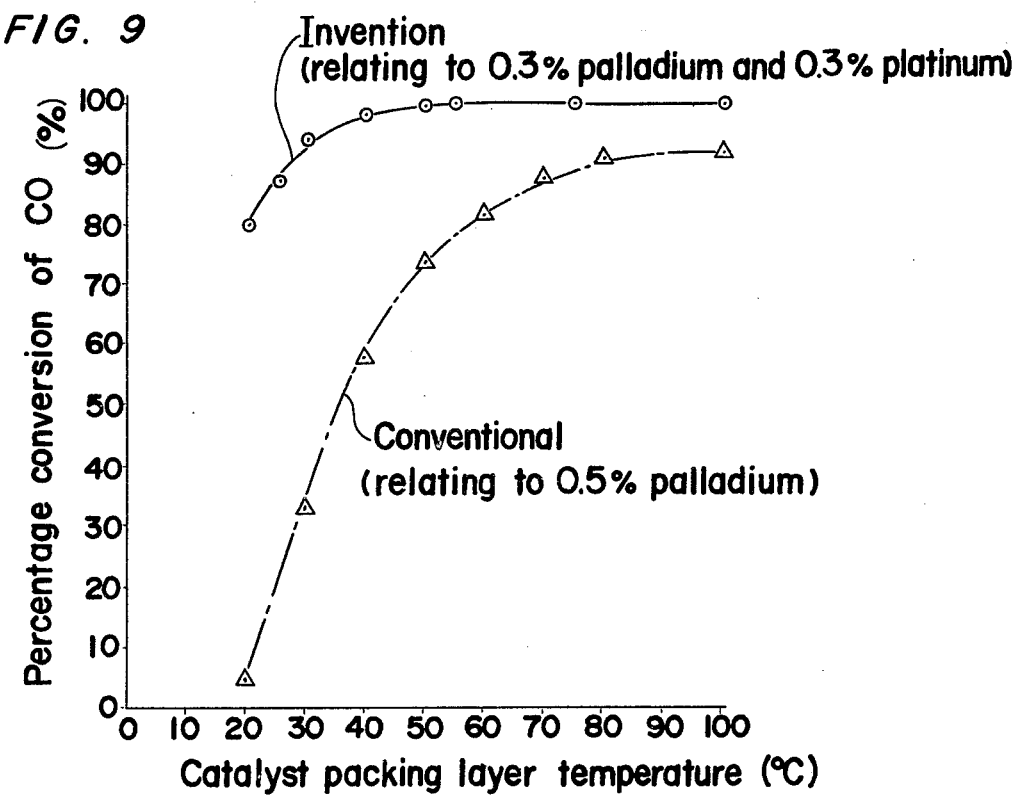
Figure 10:
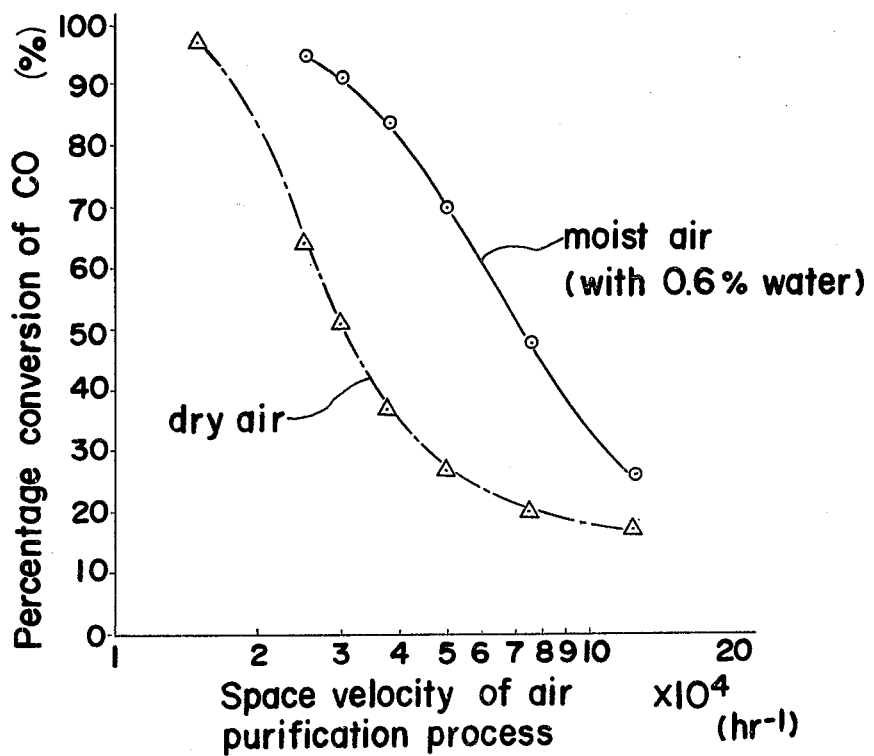

FIGS. 6, 7 and 8 are graphs respectively plotting variation of percentage conversion of carbon monoxide against temperature at which a reduction process is effected during preparation of CO removal catalysts having carriers impregnated with 0.6% palladium, 0.6% platinum, and 0.3% palladium and 0.3% platinum, respectively;

FIG. 9 is a graph showing the effect of variation of catalyst packing layer temperature on percentage conversion of CO; and FIG. 10 is a graph showing the effect which variation of space velocity of an air purification process has on percentages conversion of CO in dry air and in moist air.

Assuming that many of the problems, such as of stability and durability, conventionally associated with catalysts comprising activated carbon carriers impregnated with noble metals are closely connected with the precise type of carrier selected, the inventors prepared a variety of carrier compositions which had not previously been employed in conventional means, impregnated the carriers with various noble metals, and tested the qualities of the catalysts thus produced. It was found in the course of this work that particular advantages are offered by a carrier in the form of a hardened material produced by blending and then granulating powdered activated carbon, an alkali, and a water-hardenable cement.

It will be noted that use of alkali in catalysts, other than in catalysts used for special selective reactions caused by decomposition of an alkali, was previously considered to cause lowering of activity, particularly in oxidation catalysts.

The cement material is required to be one which hardens when water is added thereto and subsequently remains physically and chemically stable during exposure thereof to air. Various inorganic materials having such qualities can be thought of, suitable materials being, for example, bentonite, calcined plaster, portland cement, and alumina cement.

Of these materials, the most advantageous was found to be alumina cement, i.e., a cement having calcium aluminate as principal component. It is thought that the particular advantages of alumina cement are due to the fact that the cement acts as more than a simple bonding agent, hypotheses concerning such aspects of the cement being discussed in greater detail below.

After addition of water to the above-mentioned materials and blending and granulation thereof, to constitute a carrier, a noble metal may be placed on the carrier by causing adsorption of a noble metal chloride on the carrier, either using the noble metal chloride in unmodified form or preparing an aqueous solution of the noble metal chloride and immersing the carrier in the solution, and then effecting reduction, either by exposing one carrier and adsorbed noble metal chloride to a stream of dry hydrogen, or by effecting a wet reduction process using formaldehyde, hydrazine, sodium borohydride, etc. Properties of the catalyst are, of course, greatly influenced by the method, procedures, and standards selected for the reduction process, but if the above-mentioned catalyst components are employed, a satisfactory catalyst can normally be produced by any conventionally known method.

The first set of catalysts prepared was tested to determine the temperature at which 80% conversion of CO to $CO_2$ in air passed through the catalysts is achieved, a portion of the test results being shown in Table 1. In preparation of the catalysts for this initial series of assessments, use was made of the simple method of reduction under heating, employing an alkaline aqueous solution of formaldehyde.

The catalysts indicated in Table 1 consisted of carriers of various compositions carrying 0.5 wt% palladium and were prepared in each case by obtaining 20 g of granulated carrier material having a grain size in the range of 6 to 10 mesh, then immersing the carrier material in a solution of 167 mg of palladium chloride, $PdCl_2$, in 30 ml of 0.1 normal hydrochloric acid, then evaporating the material to dryness, and then effecting reduction under heat, making use of an aqueous solution prepared by mixing 10 ml of a 37 wt% formaldehyde aqueous solution and 10 ml of a 2 wt% sodium hydroxide aqueous solution.

In the tests conducted to determine catalytic activity, i.e., to determine the percentage proportion of CO which is converted to $CO_2$, this proportion being referred to below as the CO conversion rate, use was made of a reaction tube comprising a Pyrex tube having an inner diameter of 15 mm and heaters externally controllable to adjust temperature of the Pyrex tube and contents thereof. In each case, 5 ml of catalyst was packed in the reaction tube, and air into which 1.5% water vapur was introduced, to adjust humidity thereof, and to which was added CO to a concentration of 100 ppm, was passed through the catalyst bed at a flow rate of 1/min, i.e., space velocity, SV, was 12,000($hr^{-1}$). The activity of the catalyst was assessed on the basis of measurements made, using a non-dispersion CO analyzer, on the concentration of CO in air at the outlet side of the reaction tube, when temperature of the catalyst bed was kept constant. Generally, the same procedure was employed in other tests described below, and CO conversion rate was calculated as follows.

$$\text{CO conversion rate(\%)} = \frac{\text{inlet concentration(ppm)} - \text{outlet concentration(ppm)}}{\text{inlet concentration(ppm)}} \times 100$$

Table 1

| Comparison of different carriers carrying 0.5% palladium | | |
|---|---|---|
| Type of carrier | Compounding ratio | Temperature at which 80% conversion rate is achieved |
| Activated carbon | — | 42 |
| Alumina cement | — | 67 |
| Portland cement | — | 83 |
| Calcined plaster | — | 96 |
| Bentonite | — | 84 |
| Diatomaceousm earth | — | 86 |
| Activated carbon/ Alumina cement | ½ | 55 |
| Activated carbon/ Portland cement | ½ | 63 |
| Activated carbon/ Calcined plaster | ½ | 72 |
| Activated carbon/ Alumina cement/ Potassium carbonate | 3/6/1 | 30 |
| Activated carbon/ Alumina cement/ Potassium carbonate | 2/6/2 | 48 |
| Activated carbon/ Alumina cement/ Potassium carbonate | 2/7/1 | 33 |
| Activated carbon/ Alumina cement/ Potassium carbonate | 1/8/1 | 40 |
| Activated carbon/ Alumina cement/ Sodium hydroxide | 3/6/1 | 36 |
| Activated carbon/ Portland cement/ Potassium carbonate | 3/6/1 | 38 |
| Activated carbon/ Portland cement/ Potassium carbonate | 2/6/2 | 60 |
| Activated carbon/ Portland cement/ Potassium carbonate | 2/7/1 | 40 |

Table 1 compares the temperatures needed to obtain 80% conversion of CO to $CO_2$ under the above conditions, i.e., SV=1,2000 ($hr^{-1}$) for different carriers carrying 0.5% palladium. The CO conversion rate calculated by the above formula is plotted against temperature. In Table 1 above, compounding ratios of carrier material are indicated as values of percentage by weight.

As seen from Table 1, even though the method of preparation in the same for all catalysts, activity of the catalysts varies depending on the composition of the carrier material employed therein. In particular, a catalyst including a carrier constituted by activated carbon, a cement, and an alkali is much more active than a catalyst including a carrier constituted by active carbon alone. If, however, the proportion of added alkali is large, there is a tendency for the effect of the compound carrier to be weakened.

In subsequent tests, the results of which are shown in Table 2, attention was paid to the carrier constituted by activated carbon/alumina cement/potassium carbon in the proportions by weight of 3/6/1, and a comparison was made of activity of catalysts in which the carrier was the same but the carried substance was 0.5% palladium together with 0.1% platinum, ruthenium, or rhodium, 0.5% palladium alone, or 0.6% platinum alone, the procedure for determining catalytic activity being the same as described above in reference to Table 1. Impregnation of the various noble metals was effected by employment of hexachloroplatinic(IV) acid, ruthenium chloride, and rhodium chloride. Reduction was effected by the above-described reduction under heat process using an alkaline aqueous solution of formaldehyde.

Table 2

Comparison of catalysts comprising carriers impregnated with different combinations of noble metals

| Carried Noble Metal | Amount of Noble Metal (wt. %) | Temperature (°C.) at which 80% conversion is achieved |
|---|---|---|
| Palladium (Pd) | 0.5 | 24 |
| Platinum (Pt) | 0.1 | |
| Palladium (Pd) | 0.5 | 26 |
| Ruthenium (Ru) | 0.1 | |
| Palladium (Pd) | 0.5 | 26 |
| Rhodium (Rh) | 0.1 | |
| Palladium (Pd) | 0.5 | 30 |
| Platinum (Pt) | 0.6 | 45 |

It is seen from Table 2 that activity of the catalyst is greater when the carrier thereof is impregnated with a platinum metal or other noble metal as well as palladium than when the carrier is impregnated with palladium alone.

Of the added platinum metals, the most effective in improving activity was platinum, but if the carrier is impregnated with 0.6 wt% of platinum alone, activity is lower than that of a catalyst with a carrier impregnated with both palladium and platinum, and it is possible that the improved activity of the latter type of catalyst is not simply the result of addition of the activity of of platinum and the activity of palladium, but is rather the result of a multiplying effect occuring when platinum and palladium are used in combination.

After the above tests, further tests were conducted to determine the effect of varying proportions of the components of a carrier having the composition activated carbon—alumina cement(i.e., calcium aluminate)—potassium carbonate, results of these tests being shown in FIGS. 1 through 4, in which proportions of the various components are indicated as percentages of weight of the carrier. In preparation of all the catalysts used in the tests whose results are shown in FIGS. 1 through 4, reduction under heating was effected, using an alkaline aqueous solution of formaldehyde.

Figure 1:
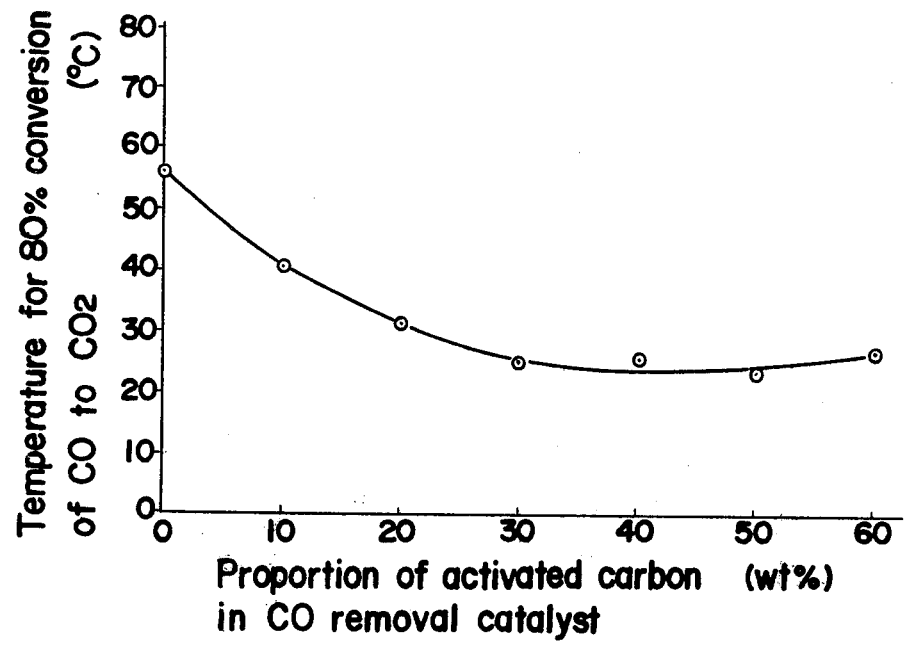
FIG. 1 is a graph plotting the proportion of activated carbon carrier material in a CO removal catalyst against the temperature at which 80% conversion of CO to $CO_2$ is achieved.

FIG. 1 shows the effect on activity by varying the proportion of activated carbon, when potassium carbonate is maintained constant at 10%, the remainder of the carrier being alumina cement (calcium aluminate). The carrier was prepared in the same manner as described above, and the amounts of the impregnating material were 0.3 wt% palladium and 0.05 wt% platinum.

It is seen from FIG. 1 that activity increases with increased addition of activated carbon up to about 30 wt%, there being a tendency to saturation for greater amounts of activated carbon. On the other hand, if the amount of activated carbon is greater than 50 wt%, the carrier becomes brittle, and it was therefore concluded that for practical purposes, the optimum amount of activated carbon in the carrier is about 30 wt%.

Figure 2:
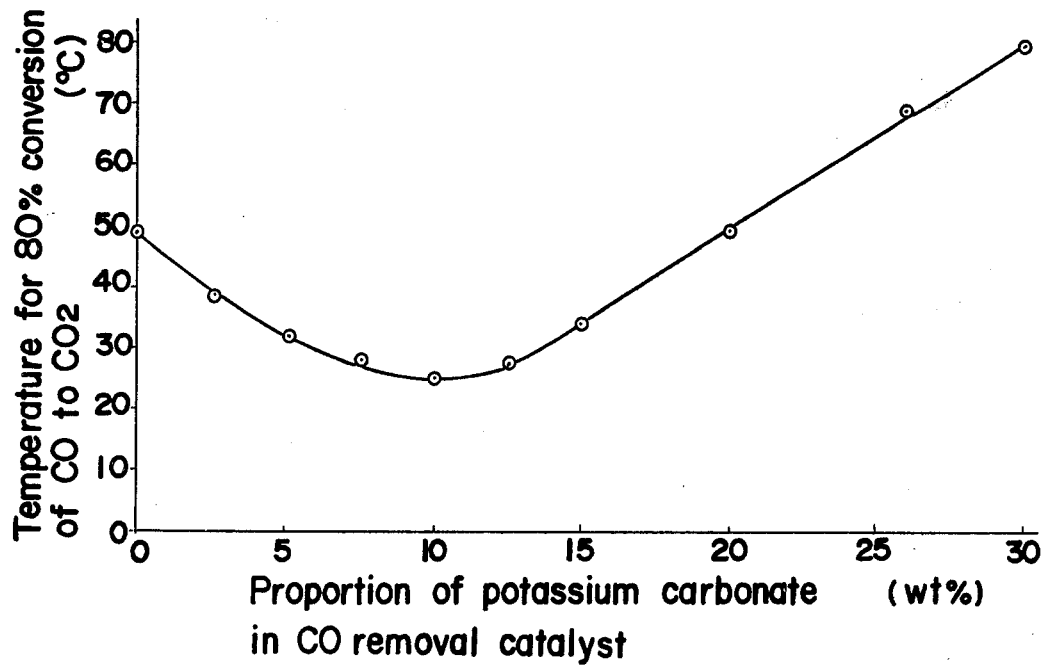
FIGS. 2, 3 and 4 are similar graphs showing the effect of variation of the proportion of materials when the carrier is potassium carbonate and the impregnated materials are palladium and platinum.

FIG. 2 shows the effect of varying the potassium carbonate content in a carrier in which activated carbon content was 30 wt% and other factors were as described with reference to FIG. 1. It is seen that for improvement of activity, a value in the vicinity of 10 wt% is probably the optimum value for addition of potassium carbonate.

Figure 3:
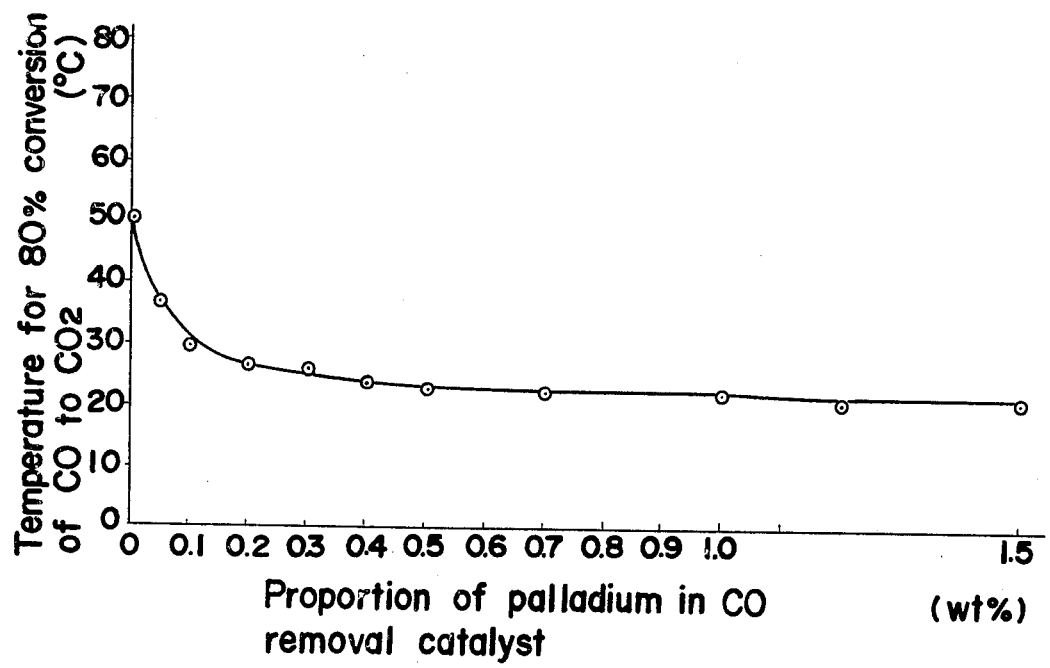

FIG. 3 relates to a carrier which has what can be thought to be the optimum composition of activator carbon/alumina cement/potassium carbonate in the proportions 3/6/1, i.e., three parts of activated carbon, six parts of alumina cement, and one part of potassium carbonate, and shows the effect of varying the amount of palladium as an impregnating material when the amount of impregnating material platinum is maintained constant at 0.1 wt%. It is seen that the palladium addition is most effective when the amount of added platinum is about 0.05 wt%.

Figure 4:
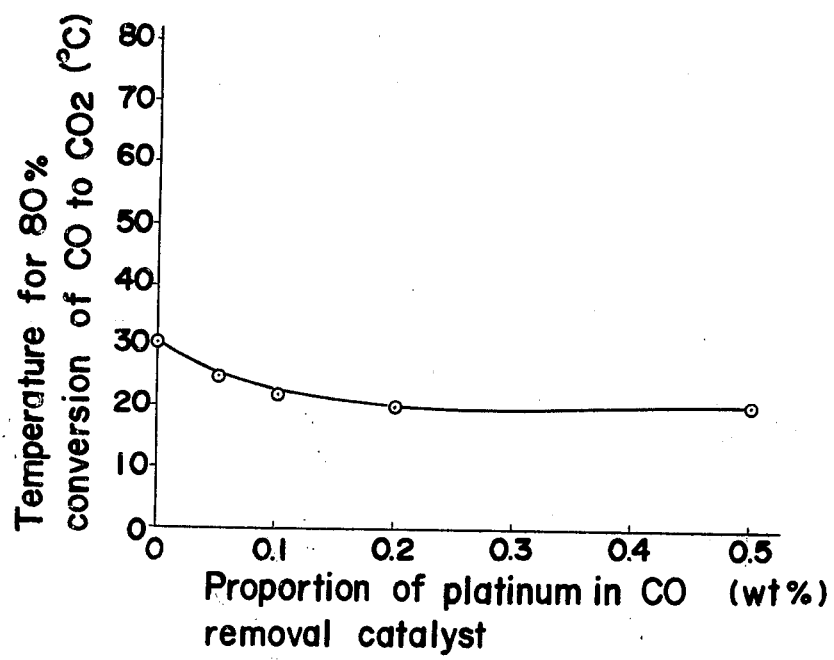

FIG. 4 shows the effect of variation of the amount of the impregnating material in catalysts in which the carrier was the same as described in reference to FIG. 3 and the amount of the impregnating material palladium was maintained constant at 0.5 wt%. It is seen that activity is increased as the platinum addition is increased up to about 0.2 wt%, further addition of platinum resulting in no further improvement.

The method of preparation of the catalysts is not, of course, limited to the method described above, but the activity of a catalyst of course varies, depending on the materials of the carrier and purity thereof and also on the method of preparation of the catalyst. In preparation of the catalysts for the above-described tests the powdered activated carbon employed was 'Shirasagi A' sold and produced by Takeda Chemical Industries, Ltd. of Japan, the potassium carbonate was 'Food Additive' potassium carbonate sold and produced by Tokyo Oka Co., Ltd. of Japan, and the alumina cement (calcium aluminate) was 'Alumina Cement No. 2' sold and produced by Denki Kagaku Kogyo Co., Ltd of Japan.

It is thought that the reason for the increased activity of the catalyst employed in the method according to the invention and comprising a carrier which includes an alkali is that the impregnating material palladium, or platinum, reacts with the alkali when it is adsorbed on the carrier, resulting in a particular dispersion-adsorption condition thereof on the surface of the carrier, or that reduction of the alkali component causes an increase of the number of active sites in the adsorbed noble metal. Also, it is possible that in the presence of an alkali the reaction

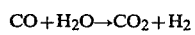

$$CO + H_2O \rightarrow CO_2 + H_2$$

takes place.

As possible support to the hypothesis that alumina cement acts as more than a simple bonding agent, it is noted that it is possible that calcium oxide in the alumina cement has the same effect as an alkali, and, as is well-known, oxides or carbonates of alkaline earth metals are very effective catalysts for promotion of the above-noted reaction.

As noted above, there is a risk of combustion when combustible material such as activated carbon is employed in a catalyst, but according to the invention, the catalyst contains about 60 wt% of cementing agent, and is therefore much more stable than a catalyst in which the carrier is constituted by activated carbon above. Further, when palladium alone is used as the impregnating material, an induction period is necessary for the reaction, but there is no induction period if platinum also is simultaneously used as an impregnating material.

After the above tests, the inventors conducted tests on poisoning of catalysts having the above-described composition by nitrogen dioxide and sulfur dioxide, which present the most serious problem in poisoning of conventional catalysts in the vicinity of room temperature.

Figure 5:
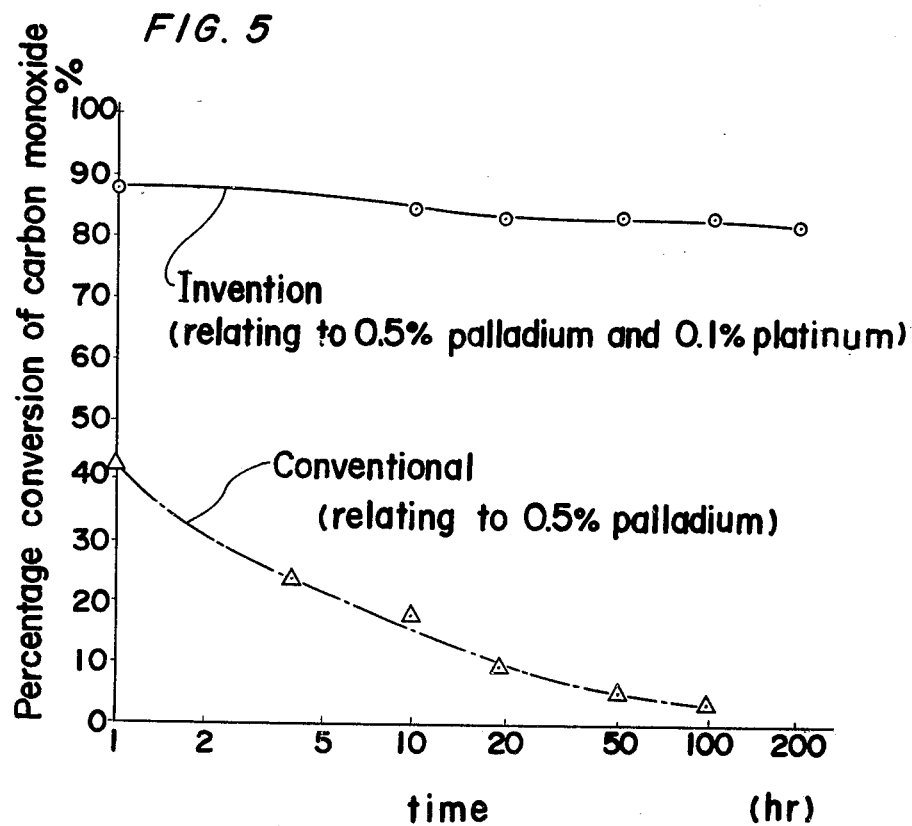
FIG. 5 is a graph plotting variation of percentage conversion of carbon monoxide with time, when catalyst material according to the invention and conventional catalyst are employed and showing the effect of $SO_2$ and $NO_2$ poisoning.

In the poisoning tests, the results of which are shown in FIG. 5, air containing 100 ppm CO, 10 ppm $NO_2$ and 10 ppm $SO_2$, and having a moisture content of 1.5% was passed at a space velocity SV of 12,000($hr^{-1}$) through a catalyst according to the invention and through a conventional catalyst at 25° C., and the change of the CO conversion rate with time was noted.

The catalyst according to the invention which was employed in these tests was constituted by a carrier composed of activated carbon/alumina cement/potassium carbonate in the proportions 3/6/1 and impregnated with 0.5 wt% palladium and 0.1 wt% platinum, and the conventional catalyst was constituted by an activated carbon carrier impregnated with 0.5 wt% palladium.

As is seen from FIG. 5, activity of the conventional, platinum—impregnated activated carbon catalyst falls markedly after approximately 100 hours, whereas steady activity of the catalyst of the invention is maintained even after 200 hours.

It is thought that the resistance of the catalyst of the invention to $SO_2$ and $NO_2$ poisoning may be due to the fact that the carrier includes an alkali, which absorbs gases such as $SO_2$ and $NO_2$, with the result that even if the surface of the noble metals is temporarily fouled by these gases, there is a cleaning action in the form of immediate dispersion and adsorption of the gases into the interior of the carrier.

If, in fact, cleaning action is in the form of absorption of the gases, there is, of course, a limit to the cleaning action, since there is a limit to the amount of gas which the alkali in the carrier can absorb. However, since concentration levels of $NO_2$, $SO_2$, etc. in the atmosphere are very low, being less than 1 ppm, even at maximum, for practical purposes the cleaning action can be expected to remain effective for about 1 year.

Thus, use of a catalyst having the above-described composition according to the invention gives definite advantages over use of conventional catalysts. Having determined this, the inventors next considered the method of preparation of the catalyst, with the object of achieving still further improvement.

Certain conditions in the process of impregnating the activated carbon—alkali cement carrier with noble metals have a determinative effect on the activity of the catalyst which is produced. These conditions will be described with reference to several specific examples.

Example 1 (comparison of reduction agents)

In preparation of the catalysts, the reduction stage was effected by various methods, in order to determine the effect on activity, which was assessed in each case by providing a bed of 2.5 g of catalyst in a reaction tube having a diameter of 15 mm, passing air containing 100 ppm CO and 2.5% water vapor at the rate of SV=20,000($hr^{-1}$) and determining the CO conversion rate, the catalyst bed being maintained at 30° C. The composition of the catalyst carrier was three parts by weight powdered activated carbon, one part by weight potassium carbonate, and six parts by weight alumina cement (calcium aluminate), and the carrier employed was granulated and classified to obtain grains having a size in the range 6 to 10 mesh.

Impregnation of the carrier material was effected as follows. 1.00 g of palladium chloride was dissolved in 100 ml of 0.1 normal hydrochloric acid, and 10 g of the carrier material was immersed for approximately 5 minutes in 10 ml of the solution thus produced. Subsequently, reduction was effected by one of the methods (1) to (4) described below.

Hydrogen reduction  (1)

The carrier material which had adsorbed palladium as a result of immersion thereof in the aqueous solution of palladium chloride was washed three times in 500 ml of water, then dried under reduced pressure for three hours, at a temperature of 100° C. and pressure of 10 mmHg, and then packed in a glass tube which had an inner diameter of 15 mm, and around which was wound a heater which was adjustable by means of a slidack to maintain the tube and contents thereof at 300° C. Hydrogen supplied from a hydrogen cylinder was passed through the carrier material in this tube for two hours at a flow rate of 0.2 l/min, which is sufficient for reduction of the above-noted amount of material. The resulting material was called Test Material (1).

Formalin reduction  (2)

After immersion of the carrier material in the palladium chloride solution for approximately 5 minutes, 20 ml of water was added, in order to permit reduction reaction of the solution and carrier material to proceed more easily. Because of the effect of the potassium chloride in the carrier material, the pH of the solution was about 11. The solution was heated to 80° C., and a sufficient amount, 0.5 ml, of formalin for causing reduction was added to the solution, which was then left for 5 minutes. The carrier material was then washed three times in 500 ml of water, and then dried under reduced pressure for three hours, temperature being 100° C. and pressure 10 mmHg. The resulting material was called Test Material (2)

Hydrazine reduction  (3)

As in the formalin reduction process, 20 ml of water was added to the solution in which the carrier material was immersed, and then 0.3 ml of hydrazine, which is sufficient for causing reduction at room temperature, was added, and the solution and carrier material were left for 5 minutes, after which washing and drying were effected in the same manner as for formalin reduction, to give Test Material (3).

Sodium borohydride reduction  (4)

The procedure was the same as mentined above. 20 ml of water was added to the solution in which the carrier material was immersed, and then 0.247 g of sodium borohydride, which is sufficient to cause reduction at room temperature, was added, and the solution and carrier material were left for 5 minutes, after which washing and drying were effected in the same manner as described above, to give Test Material (4).

Activity of the Test Materials (1) to (4) is as indicated in Table 3.

Table 3

Comparison of effects of reduction agents

| Reduction agent | Test material (1) Hydrogen | Test material (2) Formalin | Test material (3) Hydrazine | Test material (4) Sodium borohydride |
|---|---|---|---|---|
| Co conversion rate (%) | 15 | 21 | 18 | 52 |

As is clear from Table 3, much higher activity is achieved when reduction is effected using sodium borohydride.

Example 2 (Reduction under heating using sodium borohydride)

Conventionally, it is general practice to effect reduction using sodium borohydride at room temperature. Results achievable by such a reduction process being generally known, the inventors decided to carry out further investigation of the effect had on catalyst activity by the temperature at which reduction is effected.

First, catalysts having carriers impregnated with 0.6 wt% palladium were considered.

The procedure was the same as described above for production of Test Material (4), but the vessel which contained the immersed carrier material and to which the 20 ml addition of water was made was left for about 20 minutes in a constant temperature bath in order to bring the contents thereof to a set temperature, and a 0.247 g addition of sodium borohydride, in the form of solid powder, was made only after this temperature had been reached. The temperature at which the addition of sodium borohydride was made was different in different samples, and the activity of the different samples produced was subsequently determined in tests whose results are shown in FIG. 6, which plots temperature of the reduction process against activity of the resultant catalyst.

Next were considered catalysts having carriers impregnated with 0.6 wt% platinum, procedure being as follows.

1.59 g of hexachloroplatinic(IV) acid was dissolved in 100 ml of distilled water, and 10 g of carrier material was immersed for 5 minutes in 10 ml of the solution thus obtained. The subsequent procedure was as described with reference to the 0.6 wt% Pd catalysts, test results being ploted in FIG. 7, which is a graph similar to FIG. 6.

Next were considered catalysts having carriers simultaneously impregnated with 0.3 wt% palladium and 0.3 wt% platinum, the procedure being as follows.

0.50 g of palladium chloride and 0.80 g of hexachloroplatinic(IV) acid were dissolved in 100 ml of a 0.1 normal hydrochloric acid solution, after which a sample material was obtained by the same procedure as described above, the relation between catalyst activity and temperature at which reduction was effected being shown in FIG. 8.

From Table 3 and FIGS. 6, 7 and 8, it is seen that in preparation of catalyst, it is most advantageous to effect reduction using sodium borohydride and to effect the reduction process at a temperature in the range 80° to 100° C.

The reason for the improved activity when sodium borohydride is used as the reducing agent in preparation of catalysts is not clear, but it is possible that the reason is connected to the fact that the mechanism of hydrogen generation is different in the various catalysts, or the fact that in some cases the reducing agent or a decomposition product thereof may remain as a trace component in the catalyst and act to poison the catalyst or act as a co-catalyst.

For the industrial production of catalysts, in order to avoid crumbling or break-down of the catalyst or components thereof in the series of wet processes from impregnation of the carrier material to reduction, it is necessary that the materials employed have good resistance to water, and this is also a desirable quality from the point of view of practical use of the catalyst material. Tests were therefore conducted to determine what additives could be used as bonding agent, to improve water resistance without having an adverse effect on activity of the catalyst, and it was found that this object can be achieved by use of sodium carboxymethyl cellulose, sodium alginate, or bentonite as an additive. The amount of additive is suitably 0.5 wt% of the weight of the carrier raw material.

Catalyst manufacturing procedures and qualities achieved were determined on the basis of a series of chemical analyses, these procedures and qualities being described with reference to Example 3.

Example 3 (Catalyst manufacture)

600 g of powdered activated carbon, 1,200 g of alumina cement and 200 g of potassium carbonate, which were products of the above-noted brands, the potassium carbonate being finely ground so that the entirety thereof passed through a 100 mesh sieve, and 10 g of sodium carboxymethyl cellulose, in the form of 'Cellogen WS-C' sold and manufactured by Dai-ichi Kogyo Seiyaku Co., Ltd. of Japan, were dry-blended for approximately 2 minutes in a kneader, after which 1,360 ml of water was added and the materials were kneaded for 5 minutes. After this, the blended and kneaded material was extruded to the form of rods having a diameter of 3 mm and was then dried at 120° C. for 10 hours. The dried material was ground and classified to material having a grain size in the range 6 to 10 mesh. 1 kg of the carrier material thus produced was immersed for 5 hours in 1 l of a solution consisting of 5.0 g of palladium chloride ($PdCl_2$) and 8.0 g of hexachloroplatinic (IV) acid ($H_2P+Cl_6.H_2O$) dissolved in 0.1 N hydrochloric acid. After 2 l of of water was added, and the vessel containing the solution and catalyst material was left for 20 minutes in a constant temperature bath maintained at 80° C., then 16.5 g of sodium borohydride was added, and reduction was allowed to proceed for 5 minutes, after which the catalyst material was washed two times in 10 l of water and then dried for 3 hours in a 100° C. dryer.

FIG. 9 shows the relation between values of CO removal rate and the temperature of the bed of the catalyst thus produced when space velocity of air flowing through the catalyst bed is 60,000 ($hr^{-1}$), and for comparison, similar values are plotted for a catalyst which is constituted by an activated carbon carrier impregnated with 0.5 wt% palladium, and which, conventionally, has been said to be the best catalyst in terms of improved activity with increased temperature. It is seen that activity of the catalyst of the invention is higher at all temperatures.

FIG. 10 shows the relation between space velocity and rate of removal of CO from dry air and wet air by the catalyst of the invention. It is seen that the catalyst is more efficient in removing CO from wet air at all values of space velocity, unlike conventional catalysts which tend to deteriorate if exposed to water vapor. It will be noted that this feature of the catalyst of the invention is of particular advantage in practical CO removal applications.

Although the present invention has been fully described by way of examples with reference to the accompanying drawings, it is to be noted that various changes and modifications are apparent to those skilled in the art. Therefore, unless such changes and modifications depart from the true scope of the invention, they should be construed as included therein.

What is claimed is:

1. Method for the oxidation of carbon monoxide in admixture with air which comprising contacting carbon monoxide in admixture with air with a catalyst comprising a carrier in the form of a hard substance including powdered activated carbon, an alkali, and a cement and said carrier being impregnated with palladium alone or in combination with one or more elements selected from the group consisting of ruthenium, rhodium, platinum whereby carbon monoxide in said air is oxidized to carbon dioxide.

2. Method as claimed in claim 1, wherein said alkali is the hydroxide or carbonate of an alkali metal, said cement is an aluminate of an alkaline earth metal, and said carrier is impregnated with palladium alone or both palladium and platinum.

3. Method as claimed in claim 2, wherein said carrier for said catalyst comprises powdered activated carbon in an amount of from 10% to 50% by weight, potassium carbonate in an amount in the range of from 5% to 15% by weight, and calcium aluminate constituting the remainder of said carrier, and said carrier being impregnated with palladium alone in an amount equal to at least 0.1% by weight with respect to weight of said carrier, or with palladium together with platinum wherein palladium is in an amount equal to at least 0.05% by weight with respect to weight of said carrier.

4. Method as claimed in claim 3, wherein said carrier comprises one part of potassium carbonate, six parts of calcium aluminate, and three parts of powdered activated carbon.

5. Method as claimed in claim 3, wherein the impregnation of said carrier with one or both of palladium and platinum includes the step of wet reduction of a salt of one or both of platinum or palladium at a temperature in the range of from 80° C. to 100° C. using sodium borohydride, in the presence of said carrier.

6. Method for manufacture of a catalyst for the conversion of carbon monoxide to carbon dioxide which comprises
    (1) immersing a carrier comprising a hard substance including calcium aluminate, activated carbon, and potassium carbonate in an aqueous solution of a salt of at least one catalytic metal selected from the group including platinum and palladium, and
    (2) causing said carrier to adsorb said salt by reducing said salt by heating said carrier and said salt to a temperature in the range of from 80° C. to 100° C. and adding sodium borohydride.

7. A catalyst carrier comprising a solid substance including powdered activated carbon, an alkali, and a cement and said carrier being impregnated with one or more platinum metals.

8. A catalyst carrier as claimed in claim 7, wherein said alkali is the hydroxide or carbonate of an alkali metal and said cement is an aluminate of an alkaline earth metal.

9. A catalyst carrier as claimed in claim 8, wherein said carrier comprises powdered activated carbon in an amount of from 10% to 50% by weight, potassium carbonate in an amount in the range of from 5% to 15% by weight, and the remainder of said carrier comprising calcium aluminate.

10. A catalyst comprising a carrier in the form of a solid substance including powdered activated carbon, an alkali, and a cement and said carrier being impregnated with palladium alone or in combination with one or more elements selected from the group consisting of ruthenium, rhodium and platinum.

11. The catalyst as claimed in claim 10, wherein said alkali is the hydroxide or carbonate of an alkali metal and said cement is an aluminate of an alkaline earth metal, and said carrier being impregnated with palladium alone or in combination with platinum.

12. The catalyst as claimed in claim 11, wherein said carrier comprises powdered activated carbon in an amount of from 10% to 50% by weight, potassium carbonate in an amount in the range of from 5% to 15% by weight, and the remainder of said carrier comprising calcium aluminate, and said carrier being impregnated with palladium alone in an amount equal to at least 0.1% by weight with respect to weight of said carrier, or with palladium together with platinum to an amount equal to at least 0.05% by weight with respect to weight of said carrier.

13. The catalyst as claimed in claim 12, wherein said carrier comprises one part of potassium carbonate, six parts of calcium aluminate and three parts of powdered activated carbon.

* * * * *